Oct. 28, 1952 E. J. H. BUSSARD 2,615,983

TUNER FOR TELEVISION RECEIVERS

Filed May 5, 1950 3 Sheets-Sheet 1

INVENTOR.
Emmery J. H. Bussard
BY Alden D Redfield
Charles M. Hogan
ATTORNEYS

TUNER FOR TELEVISION RECEIVERS

Filed May 5, 1950 3 Sheets-Sheet 2

INVENTOR.
Emmery J.H. Bussard
BY Alden D Redfield
Charles M. Hogan
ATTORNEYS

Oct. 28, 1952 E. J. H. BUSSARD 2,615,983

TUNER FOR TELEVISION RECEIVERS

Filed May 5, 1950 3 Sheets-Sheet 3

INVENTOR.
Emmery J. H. Bussard
BY Alden D. Redfield
Charles M. Hogan
ATTORNEYS

Patented Oct. 28, 1952 2,615,983

UNITED STATES PATENT OFFICE 2,615,983

TUNER FOR TELEVISION RECEIVERS

Emmery J. H. Bussard, Cincinnati, Ohio, assignor to Avco Manufacturing Corporation, Cincinnati, Ohio, a corporation of Delaware Application May 5, 1950, Serial No. 160,316

4 Claims. (Cl. 178—44)

The present invention embraces an improved tuner which is of particular utility as embodied in a television receiver. The tuner is, in customary parlance, referred to as "the front end" of a television receiver, and the primary objectives of this invention are to provide a particularly unique front end circuit having satisfactory gain and signal-to-noise characteristics and adequate performance in other respects. The tuner provided in accordance with the invention is of the continuous type—that is, it is continuously tunable by one manual operation through the lower standard television broadcast band beginning at 54 megacycles through all bands including the upper television broadcast band ending at 216 megacycles. The primary object of the present invention is to provide a tuner which satisfies the following requirements and aims:

(1) The provision of a workable match between the radio frequency (R. F.) stage tube input impedance and the antenna transmission line impedance throughout the television broadcast range;

(2) To maintain this desirable match, to minimize the spurious responses which tend to be introduced by interfering signals such as those of intermediate frequency and image frequencies, and to attenuate all frequencies below those of the order of 34 megacycles;

(3) To enhance selectivity by tuning both input and output of the radio frequency amplifier stage;

(4) To minimize radiation of local oscillations;

(5) To provide an economical tuner construction of enhanced gain and signal-to-noise ratio.

Another object of the invention is to provide a tuner construction which incorporates adequate shielding and at the same time minimizes stray currents and inductances. Another fundamental object of the present invention is to provide a novel structure and method of construction whereby the undesirable effects of the inductances of leads and connections at very high frequencies are minimized.

For a better understanding of the present invention, together with other and further objects, advantages and capabilities thereof, reference is made to the following description of the accompanying drawings, in which there is shown a preferred illustrative tuner in accordance with the invention.

Figure 1:
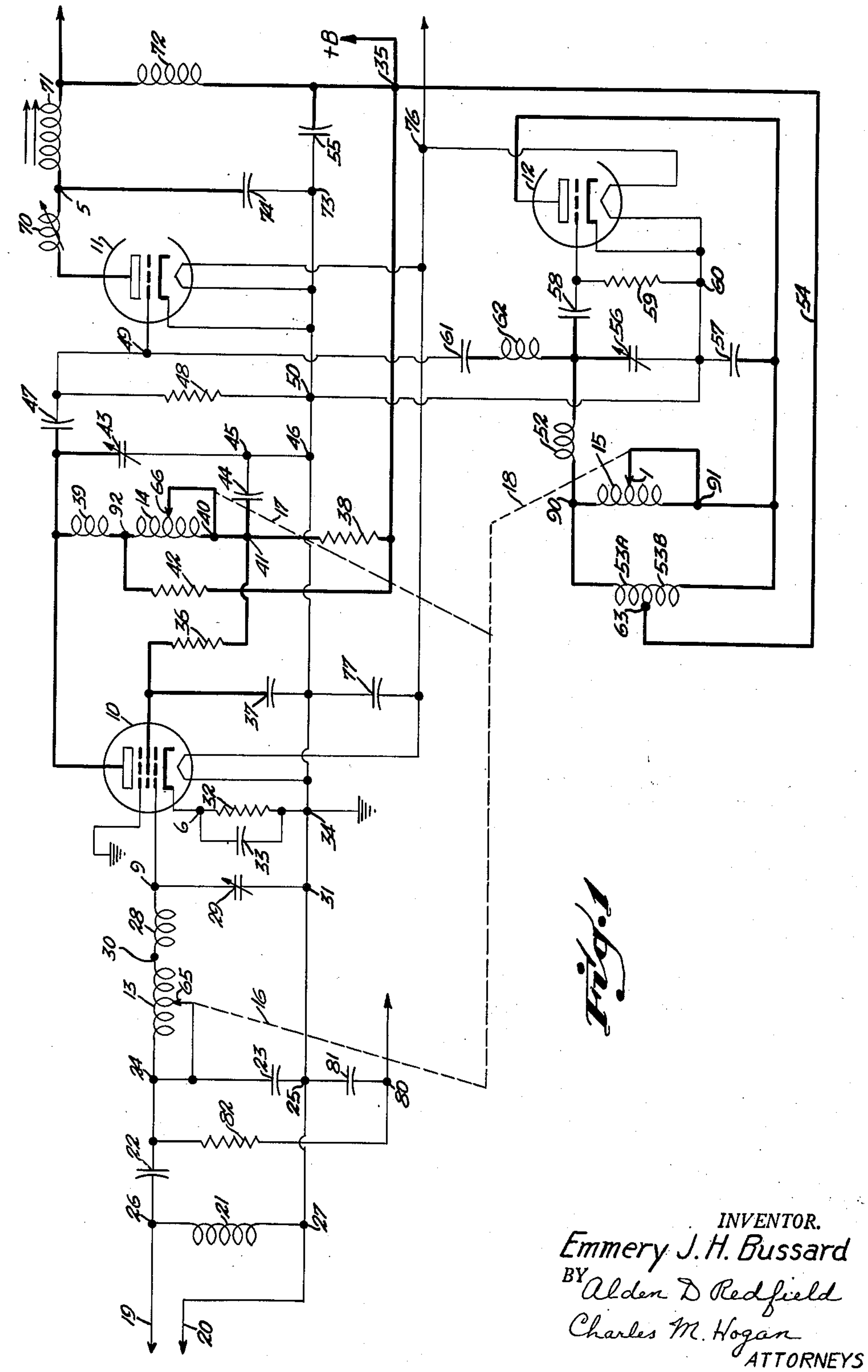
Fig. 1 is a circuit schematic of my improved tuner.
Figure 2:
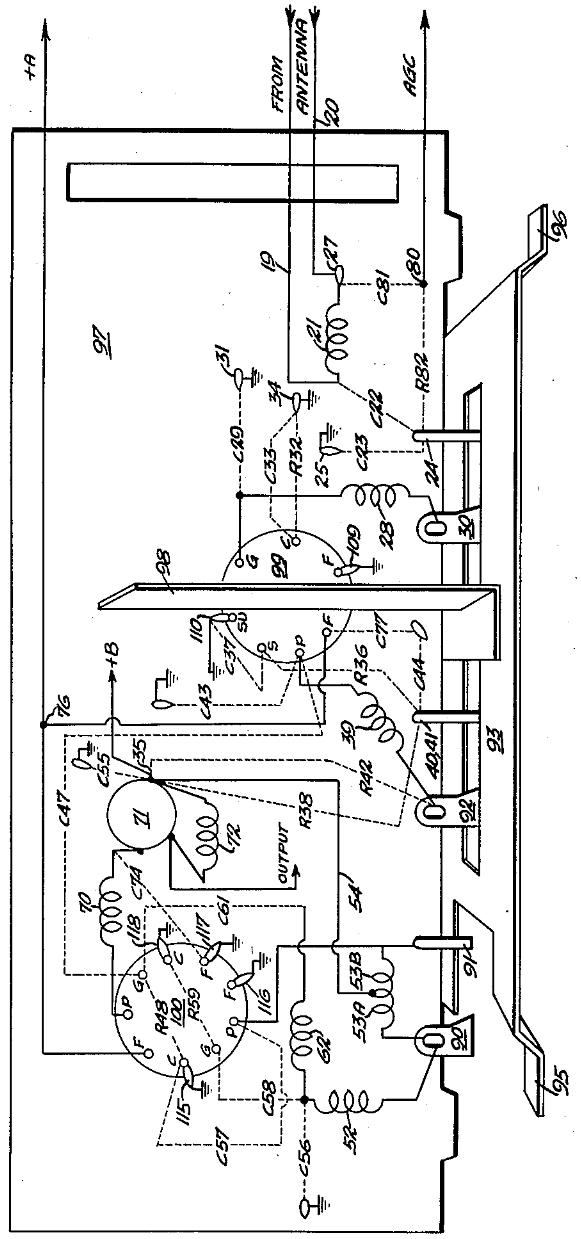
Fig. 2 is a front perspective view of a tuner assembly including the circuitry provided in accordance with the invention.

Referring now specifically to Figs. 1 and 2, it will be observed that the major tuner components are a radio frequency amplifier tube 10, a mixer or frequency-changing tube 11, a local oscillator tube 12, (elements 11, 12 being in the same envelope), and a three-circuit ganged inductor comprising variable inductances 13, 14 and 15 (shown in Fig. 1 only), the inductors being ganged for unicontrol by any suitable mechanical expedients indicated by the dashed lines 16, 17 and 18.

The preselector or R. F. amplifier stage has a novel tuned antenna input circuit provided in accordance with the invention. In the specific example shown, this circuit is coupled to an unbalanced line such as a 150 ohm twin lead cable 19, 20. This line works into and is coupled to a three-element reactive network 21, 22, 23 for matching the impedance of the line to the input impedance of the tuning circuit 13, 28, 29. This network is of the $\pi$-type and it comprises a shunt inductor arm 21, connected to the transmission line input leads and between terminals 26, 27, a series capacitor arm 22 connected between terminals 26, 24, and a shunt capacitor arm 23 connected between terminals 24, 25. This network transforms the resistance load which is offered at the terminals 24, 25 looking toward tube 10, to the value of resistance, at terminals 26, 27, required to provide a characteristic impedance load for the transmission line 19, 20. The optimum match occurs at approximately the geometric mean (108 megacycles) of the range extending from 54 to 216 megacycles.

In this manner, when the tuner is set for 108 megacycles, an impedance of approximately 70 ohms, looking into terminals 24, 25 across which capacitor 23 is connected, is transformed into an impedance approximating 150 ohms, looking into terminals 26, 27 (in the direction of tube 10).

This network provides a workable match throughout the range of received signals, the match varying within tolerable limits with the tuning. Capacitors 22 and 23 are in effect a capacity divider which steps the impedance down to approximately 70 ohms at terminals 24, 25, when the receiver is tuned to 108 megacycles.

Inductor 21 performs several useful functions in addition to its service as a parameter in the impedance transforming network 21, 22, 23. It functions as a high pass filter effectively shorting amplitude modulation (AM) broadcast signals to ground, such signals being those broadcast in the 540–1600 kilocycle band. The inductor 21 also serves as a direct current leakage path, and it prevents the undesired accumulation of static charges on the antenna.

The dimensions of inductor 21 and capacitor 22 are such that these two elements are series resonant at a value between the selected intermediate frequencies and the R. F. carrier frequency of the lowest channel. In the particular illustrative embodiment shown, these two elements are series resonant at approximately 34 megacycles. At 34 megacycles, then, there would effectively be a short circuit between terminals 24 and 27, and terminals 27 and 25 are placed so closely together that there would be in effect a short circuit between terminals 24 and 25, so that the input circuit of the radio frequency tube 10 would receive substantially no signal voltage at the frequency of 34 megacycles or at frequencies near that value, such as the intermediate frequencies. The values of inductance 21 and capacitor 22 are so chosen as to provide further good intermediate frequency signal rejection.

In determining the values of capacitor 22 and inductor 21, I have endeavored so to choose them as to produce an effective short circuit between terminals 24 and 27 at some predetermined frequency. In pursuance of an established design principle, I have approximated that frequency at 150% of the mean of the sound and video intermediate frequencies. Then I have made some compromises in favor of the use of commercially available components and in one successful embodiment of the invention so shaped the elements 21, 22 as to make them resonant at 34 megacycles. Since at that frequency the elements 21, 22 in effect create a short circuit across terminals 24, 25, it will be seen that undesired signals of that frequency are highly attenuated. Now, then, as undesired signals of progressively lower frequencies are considered, capacitor 22 presents a progressively effective series impedance to them and inductor 21 presents a progressively effective shunting impedance so that at the broadcast range of 540 to 1600 kilocycles, the inductor 21 simply short circuits the undesired signals to ground. Throughout the frequency range from direct current up to 34 megacycles, the elements 21, 22 function as a good high pass filter.

In the illustrative embodiment shown, the parameters of inductor 21, capacitor 22 and capacitor 23 are so chosen as to be parallel resonant at a value, for example, 47 megacycles, below the R. F. carrier frequency of the lowest television broadcast channel, 54 megacycles, so that the parallel resonant circuit 21, 22, 23 "looks like" a capacitance to the tuned circuit 13, 28, 29 throughout the range of operating frequencies.

A primary aim in the tuned circuit comprising inductors 13 and 28 and capacitor 29 is to build up a large R. F. current flow through capacitor 29. Another primary consideration is to make the tuning of this circuit substantially dependent on the manual variation of inductor 13 only and as independent as practicable of capacitance parameters. It will be appreciated that capacitor 29 is preset at the factory. It should be borne in mind that there is a return path for current flow in the selector circuit comprising the elements 13, 28 and 29, this return path existing between terminals 24 and 25 and comprising a number of branches, one of which consists of capacitor 23, another of which consists of the series combination of resistor 82 and capacitor 81, the third of which comprises the series combination of capacitor 22 and inductor 21, the inductor being paralleled by the antenna system. It is essential that this multi-branch return path between terminals 24 and 25 be capacitive throughout the tuning range, so that it will not introduce an inductance parameter into the tuned selector circuit. It is also essential that the capacitive reactance of this return path be low with respect to the capacitive reactance existing at the input of tube 10 and between terminals 9 and 31. The ratio of these reactances should be on the order of 2 to 1 as a minimum.

While resonant circuit 21, 22, 23 is made to "look like" a capacitance existing between terminals 24 and 25, so far as the tuned circuit 13, 28, 29 is concerned, it is also desirable to build up a high current through capacitor 23 and therefore the circuit 21, 22, 23 is made resonant at a frequency as close as practicable to the lowest operating frequency of 54 megacycles. In one successful embodiment of the invention, I have chosen a value of 47 megacycles as the resonant frequency of the circuit 21, 22, 23. It will be appreciated that if this circuit did not "look like" a capacitance to the selector circuit 13, 28, 29, it would introduce an undesired inductance parameter into the latter circuit which would limit the operating range and impair tracking among the two selector networks at input and output of the tube 10 and the oscillator tank circuits.

This tuner provides a gain, on the order of 6 db between the antenna terminals and the input terminals 9, 31 (Fig. 1), a particularly significant feature when it is considered that many commercially available tuners for television receivers show a loss between the corresponding points.

The input impedance of tube 10 considered alone, a type 6CB6 being chosen for this illustrative embodiment, varies from approximately 9,000 ohms, at the low or channel 1 end of the R. F. range, down to 500 ohms at the high or channel 13 end of the R. F. range, while the impedance looking toward the tube into terminals 24, 25 approximates 70 ohms at the mean of the range of R. F. frequencies.

While the effective impedance of tube 10, considered alone, varies between the wide limits mentioned, the input impedance between the control electrode of tube 10 and terminal 34 is maintained within relatively narrow limits on the order of 1500 ohms. In one successful embodiment of the invention, the variation was found to be between the limits of 1400 and 1650 ohms across the whole tuning range. This result is achieved by reason of a network 32, 33 which is provided between terminal 34 and the cathode of tube 10, as will be explained hereinafter. The circuitry provided in accordance with the present invention between terminals 24, 25 and the input of tube 10 is highly selective and at the same time provides adequate impedance transformation from 70 ohms to the input circuit impedance of tube 10. For these purposes I provide an L network composed of reactive elements as follows: A series combination of variable inductor 13, end inductor 28, and trimmer capacitor 29, effectively connected in series across terminals 24, 25. The capacitive element 29 is connected between one lead of coil 28 and terminal 31, terminal 31 being so close to terminal 25 as to be effectively at the same potential, and that lead of coil 28 also being connected to the control electrode of tube 10. The elements 13, 28, and 29 comprise a series selector circuit which is manually varied to be resonant at the desired channel and to tune the input of tube 10. This being a series resonant circuit, it affords the selectivity characteristic of such circuits and at the same time provides a very substantial gain approximating the product of the selector circuit Q and the input voltage across terminals 24, 25. It will be observed that the series resonant circuit 13, 28, 29 has a low impedance input approximating 70 ohms and a high impedance output (across capacitor 29) on the order of the tube input impedance between terminals 9, 31.

Referring now specifically to the radio frequency amplifying tube 10, a pentode is employed and its cathode is connected to grounded point 34 through a biasing resistor 32. The input circuit of tube 10 is so shaped as to accomplish the following objectives: (1) to minimize variations in input capacitance with transconductance, so that, looking into the tube at terminals 9, 31, there is presented a relatively stable input capacitance, thus precluding the introduction into the selector network of a widely varying frequency-determining capacitance parameter and again assuring that the selector network tuning is accomplished substantially by the variation of inductor 13 only; (2) to present a relatively constant high resistive load across terminals 9, 31, this load being sufficiently large to maintain an adequate response throughout the high frequency range under consideration.

A cathode resistor 32 is provided in part for the purpose of stabilizing the input capacitance of tube 10, and this resistor is connected between the cathode terminal and point 34. A value of 120 ohms is suitable for this resistor, although I do not desire to be limited to this specific illustrative value. As indicated at pages 15 and 16 of RCA Application Note AN-118, published April 15, 1947, by the Tube Department, Radio Corporation of America, Harrison, New Jersey, the undesired change in input capacitance with transconductance is reduced by the use of an unbypassed cathode resistor, such as element 32, in series with the cathode. In the absence of this resistor the pentode input capacitance would tend to vary with grid bias. This effect, known as the Miller effect, is of importance because it would tend to detune the selector circuit 13, 28, 29. Miller effect is minimized by incorporating a small amount of degenerative feedback, the latter being most easily accomplished by leaving the cathode resistance unbiased for R. F. The value of the resistor required depends upon the change of transconductance from cut-off to operating conditions, the grid-cathode transconductance of the tube, and the cold grid-to-cathode capacitance. To obtain full compensation for capacitance change, it can be demonstrated that it is necessary to make the product of cathode resistance and grid-cathode transconductance equal to the ratio of the increase in capacitance to the grid-cathode capacitance. The unbypassed cathode resistor reduces the effective transconductance and gain by an amount which increases with the value of the cathode resistor. An artificial increase in the amount of the cold grid-to-cathode capacitance permits the use of a smaller resistor value and lessens the loss of gain, leading to improved overall results. This purpose can be accomplished by connecting a small capacitor between the grid and cathode. In accordance with the invention, the last-mentioned capacitance parameter is supplied by two capacitors in series, 33 and 29, the series combination being located in circuit between the control electrode and the cathode and therefore in parallel with the grid-cathode interelectrode capacitance. The use of too large a value of capacitance for this purpose would have an unfavorable effect on the input conductance of the tube.

Another effect of the use of the degenerative resistor 32, supplying current feedback, is to increase the input impedance offered by the tube to the applied signal voltage as seen looking into the terminals 9, 31, and to assist in maintaining that tube impedance sufficiently high to prevent undue damping of the tuned circuit.

It is not possible to divorce the discussion of the arrangements made to stabilize input capacitance and those made to stabilize input conductance, the two being so intimately related. At high frequencies the tube input conductance components due to transmit time effects, tube lead inductance and feedback through the grid-plate capacitance from the plate circuit are effectively in parallel with the tuned grid circuit. The conductance components due to transit time effects and tube lead inductances are positive in sign and vary with the square of the frequency. The input conductance component due to feedback through the grid-plate capacitance, measured at the grid circuit resonant frequency, is negative in the particular illustrative embodiment shown, the plate load of tube 10 being so dimensioned as to incorporate an inductive component, the lead inductance between the anode of tube 10 and the inductor 39 and other distributed inductances being adequate to make the plate load as a whole appear to have an inductive component. In the absence of special precautions, the input conductance of a pentode tends to vary rapidly over the television bands.

It having been indicated that it is not possible to segregate completely for purposes of discussion the effects of varying input capacitance and input conductance, and it having been pointed out how the feedback network 32, 33, and 29 is effective to stabilize input capacitance, the same network is likewise effective to stabilize input conductance and to maintain it low throughout the desired range.

One objective of my feedback network is to prevent incorporation in the selector network of excessive shunt capacitance, and therefore I make the series capacitor 29 sufficiently small to satisfy this requirement. At the same time it is desired to incorporate a frequency sensitive network such that the 180 degree component of fedback voltage will not remain in phase at frequencies where oscillations might occur due to increased input conductance, such conditions normally occurring and appearing as parasitic oscillations. Therefore I incorporate in the feedback network and in series with the small capacitor 29 another capacitor 33 which is large in value by comparison with the value a neutralizing capacitor would have if it were directly connected between point 6 and terminal 30. At the same time, as indicated above, the capacitor 33 has reactance large by comparison with its shunting cathode resistor at normal operating frequencies, whereby resistor 32 is not R. F. bypassed at operating frequencies.

Reference is made to my copending patent application Serial No. 225,083, filed May 8, 1951, entitled "Tuner for Television Receiver" and assigned to the same assignee as the present application and invention, for claims directed to subject matter herein disclosed but not claimed.

A substantial economy is accomplished by making the cathode resistor 32 sufficiently large to function as a biasing resistor, thus permitting the omission of a bypassed resistor in series with it. It is recognized that, when resistor 32 is made sufficiently large to perform this additional function, it introduces more degenerative feedback than is optimum for purposes of stabilizing input conductance and capacitance. However, since the effect of an inductive plate load and the grid-plate feedback is such as to introduce regeneration, the plate circuit is so shaped as to compensate for the additional degeneration introduced when resistor 32 is made sufficiently large to function as the sole cathode resistor. Additional compensation is obtained by increasing the effective amount of cathode lead inductance by deliberately spacing point 6 from the socket cathode terminal.

The screen grid is connected to the positive terminal 35 of a suitable source of space current indicated by the symbol +B through a screen dropping resistor 36, bypassed by a capacitor 37, and a resistor 38 in series with resistor 36. The suppressor electrode is grounded. The anode circuit is connected to terminal 35 through a series combination of inductor 39, variable inductor 14 and resistor 38, terminal 40 of variable inductor 14 being connected to the junction 41 of resistors 36 and 38. A damping resistor 42 is connected in shunt with the series combination of inductor 14 and resistor 38, more damping action being desired at the low frequency end of the operating range. The selector circuit intercoupling amplifier tube 10 and mixer tube 11 is tuned to the desired operating frequency by adjustment of inductor 14, that inductor being a part of a parallel resonant circuit comprising an inductance branch consisting of inductors 39 and 14 and a capacitance branch consisting of adjustable capacitor 43 and capacitor 44. Junction 45 of these two capacitors is connected to ground at 46 as shown. This tuned selector network 39, 14, 43, 44 in the anode circuit of tube 10 is coupled to the control electrode input circuit of a triode mixer tube 11 by a conventional network comprising coupling capacitor 47 and grid resistor 48, the latter being connected between the control electrode terminal 49 of mixer tube 11 and ground 50 (Fig. 1).

Local oscillations are supplied to the control electrode input circuit of the frequency changing tube 11 by an oscillator including tube 12 and associated circuitry. This oscillator is described in detail in my Patent No. 2,579,789, issued December 25, 1951, entitled "Tuner for Television Receiver." Reference is made to that patent for a detailed description of the oscillator inductor 52, an inductor 53A, and the distributed inductance of conductor 54, the terminus of the latter being R. F. grounded and effectively connected to the cathode of tube 12 by a capacitor 55. The capacitance of 55 is so large that it is not a substantial frequency-determining parameter in this tank circuit. The inductance branch comprising elements 52, 53A, and 54 is paralleled by an adjustable capacitor 56, R. F. connected between cathode and control electrode of oscillator triode 12.

The oscillator also has a plate tank circuit comprising inductor 53B and the distributed inductance of conductor 54, the inductance branch 53B, 54 being paralleled by a capacitor 57, connected between anode and cathode of tube 12. This oscillator is provided with the usual grid capacitor 58 and grid resistor 59, the latter being connected between the control electrode of tube 12 and the grounded point 60. Local oscillations are injected from the grid tank circuit of this oscillator into the control electrode circuit of the mixer triode 11 by a coupling network comprising a series combination of a capacitor 61 and an inductor 62, this series circuit being tuned to a resonant frequency considerably above the range of operating frequencies, for example 340 megacycles. The frequency range of the local oscillations may extend from 80 to 240 megacycles, for example, while the range of received signal frequencies extends from 54 to 216 megacycles. I do not desire to be limited to any specific selection of frequencies, and have mentioned certain frequencies and dimensions herein for purposes of illustration only and not of limitation. The advantage of the coupling network 61, 62 is that the coupling between the oscillator and the frequency-changing tube 11 tends to become more resistive and less reactive as the receiver is attuned to higher operating frequencies, thereby compensating for the natural tendency of the output of the oscillator to decrease in intensity.

The distributed inductance of conductor 54 is common to both plate and grid tank circuits, so that a portion of the voltage fed back from the plate circuit to the grid circuit is applied to the grid circuit through this common inductance. The capacitors 56 and 57 function as a voltage divider network between input and output circuits, the voltages for their respective terminals remote from one another being approximately 180 degrees out of phase, so that feedback also results from this voltage division. This oscillator possesses a high degree of stability throughout its range of operation, for the reason among others that both oscillator tank circuits are tuned in unison. Tuning is accomplished by adjustment of variable inductor 15, the latter being connected across inductors 53A and 53B. A common coil having a tap 63 provides inductor portions 53A and 53B. The D. C. path for anode voltage may be traced from terminal 35 through conductor 54 and inductor 53B to the anode of tube 12. Inductor 52 is magnetically isolated from inductor 53A, and there is essentially no magnetic coupling therebetween.

Each of the grid and plate tank circuits, considered alone, is tuned below the operating frequency so as to appear capacitive at each operating frequency. As stated, the oscillator is adjusted as to frequency by manual adjustment of inductor 15, it being ganged with inductors 13 and 14.

Figure 3:
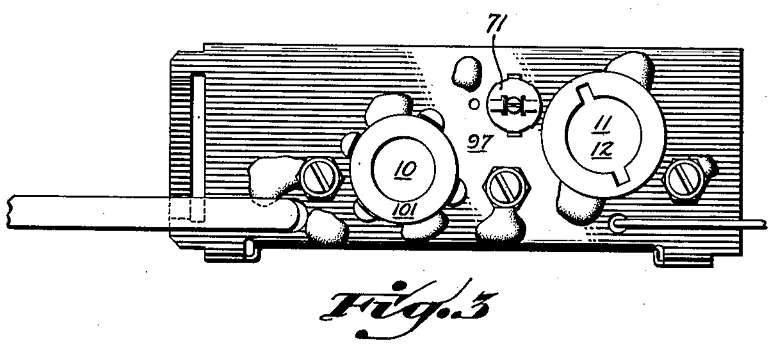
Fig 3 is a rear view of the main vertical divider member of the assembly showing tubes mounted in place.

It will be understood that the tuning elements comprising inductors 13, 14, and 15 and their adjustable contacts 65, 66, and 1, respectively, are included in a three-gang spiral continuously variable ganged inductor which may be of the general type shown in Fig. 167, page 151, of the Photofact Television Course, March 1949, Howard W. Sams & Co., Inc., Indianapolis 7, Indiana. Such an inductor is also shown in Fig. 19-3, page 379, Basic Television, Principles and Servicing, Grob, McGraw-Hill Book Co., New York, 1949, first edition. In this tuner a sliding contactor such as that indicated by the reference numeral 65 made of high silver content alloy or the like, possessing spring properties, rides on an inductor, such as that indicated by the reference numeral 13, made of silver wire or ribbon. The sliding contactor "shorts" the unused portion of the inductance. Since ganged inductors are per se well known, the elements 13, 14, 15, 65, 66, and 1 need not be shown in detail herein and are omitted from Fig. 2.

The mixer tube 11 and oscillator tube 12 may be comprised of different sections of a type 12AT7 tube, for example. It will, of course, be understood that separate tubes in separate envelopes may alternatively be used. The mixer tube has a plate load consisting of a series combination of inductor 70, iron core adjustable inductor 71, and inductor 72, the anode circuit being completed for high frequency signals by a capacitor 55. Between grounded point 73 (Fig. 1) and the junction of inductors 70, 71 is connected a capacitor 74.

As indicated in RCA Application Note AN-138, published March 15, 1949, by the Tube Department, Radio Corporation of America, Harrison, New Jersey, it is important that the plate circuit be inductive to the tuned R. F. frequencies. The mixer circuit including tube 11 is so arranged as to prevent two undesired contingencies: (1) oscillation at R. F. or I. F.; (2) undesired damping of the input circuit at R. F. To this end capacitor 74 is connected between the junction of coils 70, 71 and ground, inductor 70 and capacitor 74 together forming a series resonant circuit which resonates slightly above the maximum operating frequency (216 megacycles). This circuit 70, 74 "looks like" a very low impedance at resonance to R. F. and therefore unloads the plate circuit at R. F. and prevents a high impedance from being built up across the plate circuit at R. F., thereby tending to prevent oscillations. On the other hand, inductance 70 is too small to present any substantial impedance to I. F., and the capacitor 74 is tuned out for I. F.

The plate load of tube 11 appears inductive to the input circuit of the tube at R. F., thereby introducing a negative resistance factor into the grid circuit, which compensates for the damping factor of the normal tube loading and therefore in effect increases the Q of the grid input. This input being tuned to R. F., a high impedance is accordingly effected for R. F., while a relatively low impedance is presented to I. F. as fed back through the grid-plate capacitance.

It has been indicated that for I. F. a high impedance exists between terminals 73 and 5. This impedance is transformed into a relatively low impedance output by the L-type network comprising windings 71 and 72, the output impedance being on the order of 350 ohms.

One filament lead of tube 10 is connected to ground, and another to the ungrounded filament supply terminal 76, either direct or alternating current being suitable for this supply, heater bypass capacitor 77 being provided for the heater of tube 10. The filament connections for the tubes 11 and 12 are similar to that for tube 10, but no additional bypass capacitors are employed.

Automatic gain control potential is supplied to the grid of tube 10 from terminal 80, the latter being connected to an appropriate source of automatic gain control potential (not shown). This source may be identical to that shown in U. S. Patent No. 2,559,038 to Bass, issued July 3, 1951. Interposed between the A. G. C. source and the control electrode is a filter network comprising a shunt capacitor 81 and a series resistor 82, the latter being in series with inductors 13 and 28 and the grid of tube 10. Since the combination of resistor 82 and capacitor 81 is in shunt with capacitor 23, it resistance loads the signal input circuit between terminals 24 and 25 and provides additional damping.

Before discussing the mechanical assembly provided in accordance with the present invention, certain advantages of the circuit hereinabove described are pointed out. Oscillator radiation is particularly low with this tuner, because the combination of inductors 13 and 28 presents a very high series impedance to oscillator frequencies, while capacitor 23 affords a very low shunting impedance to those frequencies, so that they are highly attenuated.

One of the primary advantages of this tuner circuit is that the selector network 13, 28, 29 produces a very substantial gain between antenna and R. F. stage input when tuned to resonance, provides good selectivity and rejection of undesired signals, and enhances the signal-to-noise ratio.

Since both input and output circuits of the radio frequency amplifier stage 10 are tuned to the desired channel, the selectivity characteristics of this tuner are very desirable. The gain characteristics are enhanced by the effective voltage amplification occurring in the first selector network 13, 28, 29, and by the second selector network 39, 14, 44, 43. The pass band characteristics of both selector networks are adequate to assure satisfactory fidelity. Inductor 21 bypasses signals of intermediate frequency to ground. Heterodyne detection of two signals having a frequency difference lying within the tuning range of the receiver, and resultant cross talk, are suppressed by the tuned input circuit 13, 28, 29 between the grid of the R. F. tube 10 and the antenna that circuit preventing the undesired one of the interfering signals from reaching the grid of tube 10.

Image response is reduced because the two selector networks suppress image frequency signals before application to the input of the mixer tube 11. Shielding prevents coupling of undesired strays, including intermediate frequency harmonics produced by the second detector, into the radio frequency input circuits. It will be observed that the shunt input capacitance of tube 10, in parallel with capacitor 29, is one of the frequency determining parameters of the tunable selector network comprising elements 13, 28, and 29. Further, the output capacitance of tube 10 and the input capacitance of tube 11 are effectively in shunt with capacitor 43 and are frequency determining parameters in the tunable selector circuit including the elements 39, 14, 43, and 44.

While I do not desire to be limited to any specific circuit parameters, the latter varying widely in accordance with specific design requirements, the following have been found to be entirely satisfactory in one successful embodiment of the present invention:

Tube 10—type 6CB6
Tubes 11 and 12—sections of tube type 12AT7
Transmission line 19, 20—150 ohm twin lead
Resistor 82—180 ohms
Resistor 32—120 ohms
Resistor 36—15,000 ohms
Resistor 42—5600 ohms
Resistor 38—68 ohms
Resistor 48—1 megohm
Resistor 59—15,000 ohms
Capacitor 22—27 micromicrofarads
Capacitor 23—27 micromicrofarads
Capacitor 81—1500 micromicrofarads
Capacitor 29—0.8 to 6.5 micromicrofarads, adjustable
Capacitor 33—3.3 micromicrofarads
Capacitor 37—1500 micromicrofarads
Capacitor 77—1500 micromicrofarads
Capacitor 44—1500 micromicrofarads
Capacitor 43—0.8 to 6.5 micromicrofarads, adjustable
Capacitor 47—6 micromicrofarads
Capacitor 74—15 micromicrofarads
Capacitor 55—1500 micromicrofarads
Capacitor 61—1 micromicrofarad
Capacitor 56—0.8 to 6.5 micromicrofarads, adjustable
Capacitor 58—6 micromicrofarads
Capacitor 57—6 micromicrofarads
Distributed inductance of conductor 54—.01 microhenry, approximately
Inductor 21—.82 microhenry, approximately
Inductor 13—.025 to .715 microhenry, approximately
Inductor 28—.03 microhenry, approximately
Inductor 39—.02 microhenry, approximately
Inductor 14—.025 to .715 microhenry, approximately
Inductor 70—.03 microhenry, approximately
Inductor 71—2.3 microhenries, approximately
Inductor 72—.28 microhenry, approximately
Inductor 53A—.25 microhenry, approximately
Inductor 53B—.27 microhenry, approximately
Inductor 52—.035 microhenry, approximately
Inductor 15—.025 to .715 microhenry, approximately
Inductor 62—.2 microhenry, approximately The characteristics of a type 6CB6 tube are fully described and tabulated in Application Note AN-143, published March 31, 1950, by the Tube Department, Radio Corporation of America, Harrison, New Jersey.

The description now proceeds to the mechanical assembly in accordance with the present invention. It will be understood that the elements 90, 91 in Fig. 2 are the terminals of the oscillator tuning inductor 15. The two elements numbered 92 and 40, 41 are the terminals for the variable inductor 14 which tunes the output circuit of the radio frequency stage. The elements numbered 30 and 24 are the terminals of variable inductor 13 which tunes the input circuit of the radio frequency amplifier stage. The ganged inductor comprising the windings 13, 14, and 15 is not shown in Fig. 2, and reference is made to my above-mentioned patent for a detailed showing as to the method by which the subassembly illustrated in Fig. 2 is mounted on a rectangular can containing the ganged inductor elements.

The subassembly illustrated in Fig. 2 is supported on a horizontally extending metallic base member 93, suitably cut out to receive contacts 90, 91, 92, 40, 30 and 24, and provided with integral mounting feet 95, 96 and a vertically extending metallic divider member 97, formed integral with base plate 93. Another vertically extending metallic divider member 98 extends transversely of the members 93 and 97 and shields the components between the transmission line and the input circuit of the radio frequency amplifier stage 10, as well as the input circuit components of that stage, from the other tuner components. It will be understood that points such as 31 and 25 illustrated in Fig. 2 represent the termini of leads which are soldered to the vertical divider 97, the latter providing a common ground. In one practical tuner the length of the divider member 97 is approximately $4\frac{7}{16}$ inches. The base 99 for the radio frequency amplifier tube 10 (Fig. 2) and the base 100 for the oscillator and mixer tube sections 12 and 11 are located very close to the ganged inductor portions with which they cooperate, base 99 being disposed above and between contacts 92 and 30. Tube base 100 is located above and near to contacts 90 and 92. The dashed lines, such as that numbered C43, designate circuit components, such as the capacitor 43 symbolically shown in Fig. 1, which are simply suspended by their soldered leads in accordance with conventional practices. As a further example, the element numbered R48 in Fig. 2 designates the grid resistor 48 of the mixer triode 11. Those components which are shown in detail in Fig. 2, such as inductor 39, inductor 52, inductor 62, inductors 53A, 53B, inductor 70, inductor 72, inductor 28, inductor 21, and iron core inductor 71, have the same reference numerals as in Fig. 1. The unit illustrated in Fig. 2 has input line 19 and 20 from the antenna, an automatic gain control lead terminating at 80, an ungrounded heater supply lead passing through point 76 and terminating at the filament of tube 10, a high voltage supply lead terminating at point 35, and an output lead terminating at the junction of coils 71, 72. It will be observed that all grounded points in the radio frequency stage, shown in Fig. 2 to the right of divider 98, are very close together. Further, all grounded points shown to the left of the divider 98 are rather close together, the vertical divider 97 being very small. The layout is therefore such that lead length and stray lead inductances are minimized.

Figure 4:
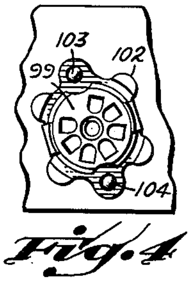
Fig. 4 is a fragmentary rear view of the mechanical assembly showing only the socket and mounting for the radio frequency amplifier tube, before soldering in place.
Figure 5:
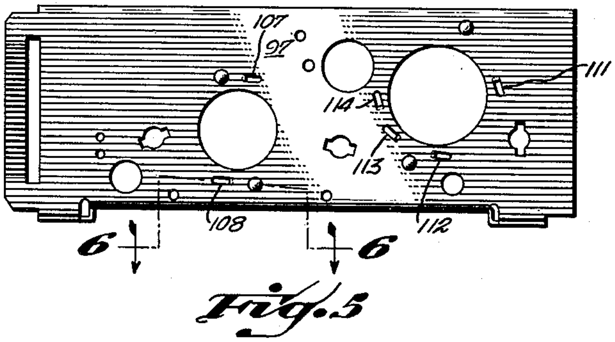
Fig. 5 is a rear view of the main vertical divider as it appears before the placement of components thereon.

Referring now to Figs. 3 and 4, it will be observed that the envelopes of the two tubes 10 and 11, 12 project rearwardly from the divider 97, the divider being suitably apertured to receive the tube bases 100 and 99. The base 99, for example, as seen in Figs. 4 and 5, is secured to a metallic member 102, which is provided with a plurality of upstanding spring arms for grasping the shielding can 101 in which the tube 10 is contained. The divider member 97 is formed with integral projections 103, 104. The projections 103, 104 fit into apertures in member 102 to position it. Solder is applied at points 103, 104 to secure member 102 to divider 97. The mounting of the tube base 100 is similar but need not be shown in detail herein.

Figure 6:
Fig. 6 is a sectional view taken on line 6—6 of Fig. 5.

Referring now to Figs. 5 and 6, there is shown another important novel feature provided in accordance with the present invention. It will be observed that the divider member 97 is formed with integral tangs 108 and 107, which are soldered, respectively, to the filament terminal 109 and the suppressor electrode terminal 110 of tube base 99 for tube 10. Additionally, the divider 97 is formed with integral tangs 111, 112, 113, 114, which are soldered, respectively, to the contacts 115 (cathode), 116 (heater), 117 (heater), and 118 (cathode) of the base 100 for tube 11, 12 (see Fig. 2). It will be understood that the base 100 as supplied by the manufacturer has integral terminals 115, 116, 117, and 118 which project outwardly and at right angles to the main insulating member of base 100. In accordance with the invention, I preform the divider member 97 with the integral tangs above described and simply push the base members 99 and 100 into place. When they are in place I bend the terminals 115, 116, 117, 118, 109, and 110 outwardly, each at approximately 90 degrees, and solder them to their respective tangs already preformed on divider 97. This process of manufacture rapidly and economically assures minimum socket base lead lengths and also minimizes the introduction of undesired stray inductances, an object heartily to be sought in electronic devices which operate at very high and ultra high frequencies.

Thus, it will be seen that I have provided, in an input tuner for a television receiver, a three element type reactive network having two arms for matching the impedance of an unbalanced transmission line 19, 20 to the input impedance of a selector circuit 13, 28, 29 comprising: an input shunt inductor arm 21 connected across said transmission line, a series capacitor 22 connected between the high potential terminals 26, 24 of the arms, and an output shunt capacitor arm 23, said inductor arm providing attenuation of carrier signals having frequencies on the order of those of the amplitude modulation broadcast band (540 to 1600 kilocycles), said inductor arm and said series capacitor being series resonant at a frequency (34 megacycles) above the intermediate frequencies (21.9 megacycles for sound and 26.4 megacycles for video) of said television receiver and considerably below the television bands extending from 54 to 216 megacycles, whereby said inductor and series capacitor function as a high pass filter to reject undesired signals of frequencies below the series resonant frequency, both of said capacitors functioning as a capacitance divider to step down the impedance between the input (150 ohms) and output (70 ohms at geometric mean of range) of said network, the parallel resonant circuit comprising both of said arms and said series capacitor being tuned to parallel resonance at a frequency (47 megacycles) close to that of the lowest television channel, whereby the output of the network appears to be capacitively reactive throughout the television band and substantial carrier frequency current flows in said output capacitor arm 23.

The invention also provides, in combination with said impedance-transformation network: a low impedance input, high impedance output, L-type selector network for coupling said $\pi$-type reactive network to said amplifier stage, comprising: an output shunt capacitor arm 29 and series manually variable inductance 13, 28, connected between the high potential terminal 24 of the output arm of said $\pi$-type reactive network and the last-mentioned output arm 29, said L-type network being tuned to series resonance to select the desired television channel and at the same time providing impedance transformation from a low impedance at its input to the high impedance at its output, thus adequately matching the input impedance of said amplifier stage.

As indicated, the series variable inductance 13, 28, shunt capacitor 29, selector network which is coupled to the input circuit of repeater tube 10 has its capacitor 29 in its output arm. The invention also provides means for stabilizing the input capacitance and conductance of said tube comprising a stabilizing resistor 32 in circuit with the cathode (of tube 10) and capacitance between the cathode and control electrode (of tube 10) comprising a series combination of said output arm capacitor 29 and another capacitor 33. This other capacitor 33 is in shunt with the cathode resistor 32 and has reactance large with respect to said resistor 32. The output arm capacitor 29 has a reactance large with respect to said other capacitor 33. An inductive plate load is included in the output circuit of the radio frequency amplifier tube 10.

Further, in accordance with the invention, both input and output selector networks maintain their wide pass bands throughout the range of operation, both the R. F. amplifier stage and the mixer stage having plate loads which appear inductive to their input circuits, thus introducing negative resistance factors which effectively increase the Q's of the selective input circuits.

According to another feature of the invention, stray inductance is minimized by providing integral tangs (such as 108, Fig. 6) projecting at right angles from the metallic support 97 and soldering those tangs directly to their corresponding socket terminals (such as 109, Fig. 2), the socket terminal having been bent approximately into parallelism with the chassis for that purpose.

Another advantage is provided in that the cathode resistor functions not only as a stabilizing resistor but also as a cathode bias resistor.

Other advantages of the present invention reside in these two facts: (1) this tuner is continuously tunable throughout the range from 54 megacycles to 216 megacycles; (2) the pass band of this tuner is maintained sufficiently wide to pass the signal components of any of the selected television channels, throughout this very broad range of operation. In order to preserve adequate uniformity of pass band in the radio frequency and mixer stages, it is necessary to provide means for effectively increasing the Q's of the grid input circuits of tubes 10 and 11 as the operating frequency is increased. Each of the plate loads in these two stages appears inductive to the corresponding input circuit, thereby providing regeneration which increases the Q of the grid input. This regenerative effect becomes more pronounced with frequency increase because of the coaction of two factors: (1) the capacitive reactance between grid and plate decreases with increasing frequency; (2) the inductive reactance of the plate leads increases with increasing frequency.

While there has been shown and described what is at present considered to be the preferred embodiment of the invention, it will be obvious to those skilled in the art that various modifications and substitutions of equivalents may be made therein without departing from the true spirit of the invention and the scope of the claims appended hereto. While the illustrative embodiment shown is used in conjunction with an unbalanced input system, it can easily be used with a balanced input system by a simple expedient which will be well known to those skilled in the art, and that is by providing a tap on inductor 21 and connecting that tap to terminal 25, omitting the connection between terminals 27 and 25; such expedients as that being per se so well known in the art that there is no necessity to illustrate them herein.

I claim:

1. In a continuous input tuner for a television receiver, a three element π-type reactive network having two arms for matching the impedance of a transmission line to the input impedance of a selector circuit comprising: an input shunt inductor arm directly connected across said transmission line, a fixed series capacitor connected between the high potential terminals of the arms, and a fixed output shunt capacitor arm, said inductor arm providing attenuation of carrier signals having frequencies on the order of those of the amplitude modulation broadcast band (540 to 1600 kilocycles), said inductor arm and said series capacitor being series resonant at a frequency above the intermediate frequencies of said television receiver and considerably below the television bands extending from 54 to 216 megacycles, whereby said inductor and series capacitor function as a high pass filter to reject undesired signals of frequencies below the series resonant frequency, both of said capacitors functioning as a capacitance divider to step down the impedance between the input and output of said network, the parallel resonant circuit comprising both of said arms and said series capacitor being fixed tuned to parallel resonance at a frequency close to that of the lowest television channel, whereby the output of the network appears to be capacitively reactive throughout the television band and substantial carrier frequency current flows in said output capacitor arm.

2. In a continuous input tuner for a television receiver, a three element π-type reactive network having two arms for matching the impedance of a transmission line to the input impedance of a selector circuit comprising: an input shunt inductor arm connected directly across said transmission line, a fixed series capacitor connected between the high potential terminals of the arms, and a fixed output shunt capacitor arm, said inductor arm providing attenuation of carrier signals having frequencies on the order of those of the amplitude modulation broadcast band (540 to 1600 kilocycles), said inductor arm and said series capacitor being series resonant at a frequency (34 megacycles) above the intermediate frequencies (21.9 megacycles for sound and 26.4 megacycles for video) of said television receiver and considerably below the television bands extending from 54 to 216 megacycles, whereby said inductor and series capacitor function as a high pass filter to reject undesired signals of frequencies below the series resonant frequency, both of said capacitors functioning as a capacitance divider to step down the impedance between the input (150 ohms) and output (70 ohms at geometric mean of range) of said network, the parallel resonant circuit comprising both of said arms and said series capacitor being fixed tuned to parallel resonance at a frequency (47 megacycles) close to that of the lowest television channel, whereby the output of the network appears to be capacitively reactive throughout the television band and substantial carrier frequency current flows in said output capacitor arm.

3. In a continuous input tuner for a television receiver, a three element π-type reactive network having two arms for matching the impedance of a transmission line to the input impedance of a selector circuit comprising: an input shunt inductor arm of 0.82 microhenry directly connected across said transmission line, a fixed series capacitor of 27 micromicrofarads connected between the high potential terminals of the arms, and a fixed output shunt capacitor arm of 27 micromicrofarads, said inductor arm providing attenuation of carrier signals having frequencies on the order of those of the amplitude modulation broadcast band (540 to 1600 kilocycles), said inductor arm and said series capacitor being series resonant at a frequency above the intermediate frequencies of said television receiver and considerably below the television bands extending from 54 to 216 megacycles, whereby said inductor and series capacitor function as a high pass filter to reject undesired signals of frequencies below the series resonant frequency, both of said capacitors functioning as a capacitance divider to step down the impedance between the input and output of said network, the parallel resonant circuit comprising both of said arms and said series capacitor being fixed tuned to parallel resonance at a frequency close to that of the lowest television channel, whereby the output of the network appears to be capacitively reactive throughout the television band and substantial carrier frequency current flows in said output capacitor arm.

4. In a continuous input tuner for a television receiver of the type which includes an antenna system having a transmission line and a radio frequency amplifier stage having an input circuit, the combination of: First, a three element π-type reactive network having two arms for matching the impedance of said transmission line to the input impedance of a selector circuit, said network comprising an input shunt inductor arm connected directly across said transmission line, a fixed series capacitor connected between the arms, and a fixed output shunt capacitor arm, said inductor arm providing attenuation against carrier signals having frequencies on the order of those of the amplitude modulation broadcast band (540 to 1600 kilocycles), said inductor arm and said series capacitor being series resonant at a frequency above the intermediate frequencies of said television receiver and considerably below the television bands extending from 54 to 216 megacycles, whereby said inductor and series capacitor function as a high pass filter to reject the undesired signals of frequencies below the series resonant frequency, both of said capacitors functioning as a capacitance divider to step down the impedance between the input and output of said network, the circuit comprising both of said arms and said series capacitor being fixed tuned to parallel resonance at a frequency close to that of the lowest television channel, whereby the output of the network appears to be capacitively reactive throughout the television band and substantial carrier frequency current is built up across said output capacitor arm; and, Second, a low impedance input, high impedance output, L-type selector network for coupling said π-type reactive network to said amplifier stage, comprising: an output shunt capacitor arm and series manually variable inductance, connected between the high potential terminal of the output arm of said π-type reactive network and the last-mentioned output arm, said L-type network being tuned to series resonance to select the desired television channel and at the same time providing impedance transformation from a low impedance at its input to the high impedance at its output, thus adequately matching the input impedance of said amplifier stage.

EMMERY J. H. BUSSARD.

REFERENCES CITED

The following references are of record in the file of this patent:

UNITED STATES PATENTS

| Number | Name | Date |
|---|---|---|
| 1,762,945 | Anderson | June 10, 1930 |
| 2,026,759 | Turner | Jan. 7, 1936 |
| 2,061,416 | Blume | Nov. 17, 1936 |
| 2,088,322 | Henning | July 27, 1937 |
| 2,205,051 | Schmitt | June 18, 1940 |
| 2,207,796 | Grundmann | July 16, 1940 |
| 2,335,496 | Foster et al. | Nov. 30, 1943 |
| 2,393,785 | Leeds | Jan. 29, 1946 |
| 2,496,321 | Wallin | Feb. 7, 1950 |
| 2,537,052 | Haeff et al. | Jan. 9, 1951 |

FOREIGN PATENTS

| Number | Country | Date |
|---|---|---|
| 849,116 | France | Aug. 7, 1939 |
| 72,040 | Norway | May 5, 1947 |